United States Patent Office 3,828,028
Patented Aug. 6, 1974

3,828,028
PROCESS FOR PREPARING LACTAM COMPLEXES
Mitsuo Masaki, Chiba, and Kiyoshi Fikui, Jyun'ichiro Kita, and Izuhiko Uchida, Ichihara, Japan, assignors to Ube Industries Ltd., Yamaguchi-ken, Japan
No Drawing. Filed Apr. 24, 1972, Ser. No. 247,009
Int. Cl. C07d 41/06
U.S. Cl. 260—239.3 R  6 Claims

ABSTRACT OF THE DISCLOSURE

An improved process for producing a lactam complex which may be readily converted to a corresponding lactam from an alicyclic ketoxime complex by reacting said ketoxime complex with a lactime-O-sulfonic acid metal compound, as a rearrangement reagent, of the following formula (2)

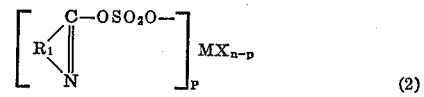
(2)

wherein $R_1$ is an alkylene group or substituted alkylene group having 3 to 11 carbon atoms in the main chain, M is a metal atom selected from metals of groups IIb, IIIa, IV and Va of the periodic table, X is a halogen atom, n is the maximum valency of M and is a positive integer of 2 to 5, and p is equal to n or a positive integer smaller than n.

---

This invention relates to an improved process for preparing lactam complexes in good yields.

Commercial production of lactams has previously been carried out by the Beckmann rearrangement of alicyclic ketoximes or hydrochlorides thereof using sulfuric acid or fuming sulfuric acid. According to this reaction, the acid is used in an excess mol, and the reaction mixture containing lactam sulfate formed is treated with water containing an alkali such as ammonia to form ammonium sulfate and thereby to recover the lactam. The by-product salt amounts to as large as 1.7 to 2.2 tons, for example, for producing one ton of the lactam, and this is extremely disadvantageous.

In an attempt to avoid such a disadvantage, some proposals have recently been made. One of these proposals is shown in Belgian Patent 755,574 granted 13th November, 1970 and Belgian Patent 755,465 granted on 30th October, 1970. This proposal discloses the formation of a lactam complex by reacting an alicyclic ketoxime complex with a lactim-O-sulfonic acid of the following formula as a rearrangement reagent

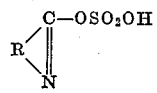

wherein R is an alkylene or substituted alkylene group having 3 to 11 carbon atoms in the main chain. The proposal also teaches that the reaction can be carried out in the presence of a metal halide or a complex formed between the metal halide and ether.

This proposed reaction is a novel one which is noteworthy for commercial production, but still requires further improvements in the shortening of the reaction time, the avoiding of side-reactions, the recovery of high purity product, or the increased yield, etc. The present invention relates to an improvement of this reaction, and differs from the above proposal in that as the rearrangement reagent, a lactim-O-sulfonic acid metal compound is used of the following formula (2)

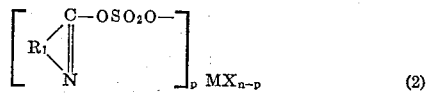
(2)

wherein $R_1$ is an alkylene group or substituted alkylene group having 3 to 11 carbon atoms in the main chain, M is a metal atom selected from metals of groups IIb, IIIa, IV and Va of the periodic table, X is a halogen atom, n is the maximum valency of M and is a positive integer of 2 to 5, and p is equal to n or a positive integer smaller than n.

The periodic table used in the present specification and claims is described in "Kagaku Binran" (Manual of Chemistry), 1961, edited by The Chemical Society of Japan and published by Maruzen Co., Ltd.

According to this improved process, the reaction time can be shortened, side-reactions hardly occur (less coloration of the reaction mixture), the separation and recovery of the product from the reaction system can be further improved, and the yield of the product is increased. Thus, a high purity product can be recovered from the reaction mixture with better separability and in better yields.

J. Org. Chem., 20, 1482 (1955) discloses that when an alicyclic ketoxime complex,

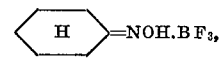

is heated for 30 minutes at 90° C. in toluene, the rearrangement reaction does not occur and the starting compound is recovered in the original state, and that when an alicyclic ketoxime

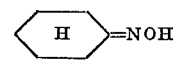

is treated with a large excess of a complex of acetic acid and $BF_3$ at 115 to 120° C., the rearrangement reaction occurs and by the neutralization and hydrolysis of the reaction mixture, a lactam is obtained in a high yield.

This method would be acceptable on a laboratory scale, but is not commercially feasible. One reason is that a large excess of $BF_3$ with regard to the starting alicyclic ketoxime must be used, and since the resulting lactam·$BF_3$ complex is dissolved in a highly polar acetic acid·$BF_3$ complex solvent, the operation of recovering the complex from the reaction product mixture is difficult and complicated. Another reason is that a special neutralizing agent must be used in neutralizing the reaction product and recovering the lactam, and a large quantity of a by-product is formed because of the neutralization agent used.

It has now been found that these difficulties can be overcome by using the lactim-O-sulfonic acid metal compound of formula (2) above as the rearrangement reagent.

Accordingly, an object of this invention is to provide an improved process for preparing lactam complexes which can be readily converted to lactams in good yields.

Another object of this invention is to provide a novel rearrangement reaction capable of bringing about the above-mentioned advantages.

Many other objects together with the advantages of this invention will become more apparent from the following description.

In accordance with the present invention, lactam complexes expressed by the following formula (1)

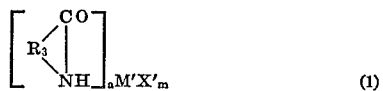
(1)

wherein $R_3$ is a group selected from $R_1$ and $R_2$ to be defined below, and $M'$, $X'$, $m$ and $a$ are the same as those defined below with respect to formula (3), are prepared by reacting lactim-O-sulfonic acid metal compounds expressed by the following formula (2)

(2)

wherein $R_1$ is an alkylene group or substituted alkylene group having 3 to 11 carbon atoms in the main chain, M is a metal atom selected from metals of the groups IIb, IIIa, IV and Va of the periodic table, X is a halogen atom, $n$ is the maximum valency of M and is a positive integer of 2 to 5, and $p$ is equal to $n$ or a positive integer smaller than $n$, with alicyclic ketoxime complexes expressed by the following formula (3)

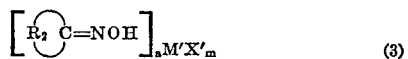
(3)

wherein $R_2$ has the same meaning as $R_1$ defined with respect to formula (2) and may be the same as, or different from $R_1$, $M'$ has the same meaning as M defined with respect to formula (2) and may be the same as, or different from M, $X'$ has the same meaning as X defined with respect to formula (2) and may be the same as, or different from, X, $a$ is 1 or 2, and $m$ is the maximum valency of $M'$ and is a positive integer of 2 to 5, in a substantially anhydrous condition.

Where $R_1$ in formula (2) above is a substituted alkylene group, examples of the preferred substituents are alkyl groups having 1 to 6 carbon atoms, alkenyl group having 2 to 4 carbon atoms, nitro group, halogen atoms (Cl, Br, I, F) and phenyl groups which may be substituted with a group selected from said alkyl groups, alkenyl groups, nitro group, and halogen atoms.

Examples of the preferred metal atoms represented by M is formula (2) include those of groups IIb, 4th period, IIIa, 2nd to 6th periods, IV, 3rd to 7th periods, and Va, 5th and 6th periods of the periodic table. More preferably, the metal atom is selected from those of the groups IIb, 4th period, IIIa, 2nd and 3rd periods, IV, 4th to 7th periods, and Va, 5th period, for example, Zn, B, Al, Ti, Ge, Zr, Sn, Hf, Pb Th or Sb.

Since the compound of formula (2) can be in the form of for example, a metal-containing aligomer which contains this compound as a unit component, the formula (2) described in the present specification and claims should be understood as including such a form.

Specific examples of the compounds of formula (2) used as a rearrangement reagent in the present invention include:

zinc bis(caprolactim-O-sulfonate,
dichloro boron (caprolactim-O-sulfonate),
dichloro aluminum (caprolactim-O-sulfonate),
difluoro tin bis(caprolactim-O-sulfonate),
dichloro tin bis(caprolactim-O-sulfonate),
dibromo tin bis(caprolactim-O-sulfonate),
zirconium tetrakis (caprolactim-O-sulfonate),
dichloro titanium bis(caprolactim-O-sulfonate),
chloro titanium tris(caprolactim-O-sulfonate),
trichloro silicon (caprolactim-O-sulfonate),
dichloro silicon bis(caprolactim-O-sulfonate),
chloro silicon tris (caprolactim-O-sulfonate),
dichloro germanium bis(caprolactim-O-sulfonate),
trichloro lead (caprolactim-O-sulfonate),
thorium tetrakis(caprolactim-O-sulfonate)
hafnium tetrakis(caprolactim-O-sulfonate),
tetrachloro antimony(caprolactim-O-sulfonate),
dichloro tin bis(enantholactim-O-sulfonate),
zirconium tetrakis(caprilolactim-O-sulfonate),
zirconium tetrakis(caprilactim-O-sulfonate),
dichloro titanium bis(undecanolactim-O-sulfonate),
zirconium tetrakis(laurolactim-O-sulfonate),
dichloro tin bis($\gamma$-methylcaprolactim-O-sulfonate),
trichloro titanium($\gamma$-methylcaprolactim-O-sulfonate),
zirconium tetrakis($\delta$-ethylvalerolactim-O-sulfonate),
and dimers, trimers, tetramers, and polymers of the above illustrated compounds.

$R_2$ in formula (3) representing the alicyclic ketoxime complex has the same meaning as the definition of $R_1$ in formula (2) representing the lactim-O-sulfonic acid metal compound, but need not be the same as group $R_1$, $X'$ in formula (3) has the same meaning as the definition of X in formula (2), but need not be the same as X and may be a different halogen atom.

$M'$ in formula (3) has the same meaning as the definition of M in formula (2), but may be the same as, or different from, M. Preferably, $M'$ is selected from the group: of metals of groups IIb, 4th period: IIIa, 2nd and 3rd periods: IV, 5th to 7th periods (more preferably 5th period): and Va, 5th period: of the periodic table. Specific examples of the preferred metal atoms include Zn, B, Al, Zr, Sn, or Sb.

Specific complexes of formula (3) are the alicyclic ketoxime complexes shown in the following table.

| $R_2$ | $a$ | $M'X'_m$ | Compounds |
|---|---|---|---|
| —(CH$_2$)$_3$— | 2 | SnCl$_4$ | Cyclobutanone oxime-stannic chloride complex. |
| —(CH$_2$)$_4$— | 2 | SnCl$_4$ | Cyclopentanone oxime-stannic chloride complex. |
| —(CH$_2$)$_5$— | 2 | SnCl$_4$ | Cyclohexanone oxime-stannic chloride complex. |
| —(CH$_2$)$_6$— | 2 | SnCl$_4$ | Cycloheptanone oxime-stannic chloride complex. |
| —(CH$_2$)$_7$— | 2 | SnCl$_4$ | Cyclooctanone oxime-stannic chloride complex. |
| —(CH$_2$)$_8$— | 2 | SnCl$_4$ | Cyclononanone oxime-stannic chloride complex. |
| —(CH$_2$)$_9$— | 2 | SnCl$_4$ | Cyclodecanone oxime-stannic chloride complex. |
| —(CH$_2$)$_{10}$— | 2 | SnCl$_4$ | Cycloundecanone oxime-stannic chloride complex. |
| —(CH$_2$)$_{11}$— | 2 | SnCl$_4$ | Cyclododecanone oxime-stannic chloride complex. |
| —(CH$_2$)$_2$CH(CH$_2$)$_2$—<br>             CH$_3$ | 2 | SnCl$_4$ | 4-methylcyclohexanone oxime-stannic chloride complex. |
| —(CH$_2$)$_3$CH·CH$_2$—<br>           CH$_3$ | 2 | SnCl$_4$ | 3-methylcyclohexanone oxime-stannic chloride complex. |
| —(CH$_2$)$_4$CH—<br>        CH$_3$ | 2 | SnCl$_4$ | 2-methylcyclohexanone oxime-stannic chloride complex. |
| —(CH$_2$)$_2$CH.CH$_2$<br>         CH$_3$ | 2 | SnCl$_4$ | 3-methylcyclopentanone oxime-stannic chloride complex. |
| —CH(CH$_2$)$_3$—<br>   C$_2$H$_5$ | 2 | SnCl$_4$ | 2-ethylcyclopentanone oxime-stannic chloride complex. |
| —(CH$_2$)$_2$CH(CH$_2$)$_2$<br>            CH=CH$_2$ | 2 | SnCl$_4$ | 4-vinylcyclohexanone oxime-stannic chloride complex. |
|    CH$_3$<br>—C(CH$_2$)$_4$—<br>   CH$_3$ | 2 | SnCl$_4$ | 2,2-dimethylcyclohexanone oxime-stannic chloride complex. |
| —(CH$_2$)$_4$CH—<br>        NO$_2$ | 2 | SnCl$_4$ | 2-nitrocyclohexanone oxime-stannicchloride complex. |

TABLE—Continued

| $R_2$ | $a$ | $M'X'_m$ | Compounds |
|---|---|---|---|
| $-(CH_2)_4\underset{\underset{C_6H_5}{\vert}}{\overset{\overset{C_6H_5}{\vert}}{C}}-$ | 2 | $SnCl_4$ | 2,2-diphenylcyclohexanone oxime-stannic chloride complex. |
| $-(CH_2)_4\underset{\underset{Cl}{\vert}}{C}H-$ | 2 | $SnCl_4$ | 2-chlorocyclohexanone oxime-stannic chloride complex. |
| $-(CH_2)_5-$ | 2 | $SnBr_4$ | Cyclohexanone oxime-stannic bromide complex. |
| $-(CH_2)_5-$ | 1 | $SbCl_5$ | Cyclohexanone oxime-antimony pentachloride complex. |
| $-(CH_2)_5$ | 1 | $BF_3$ | Cyclohexanone oxime-boron trifluoride complex. |
| $-(CH_2)_5-$ | 2 | $ZnCl_2$ | Cyclohexanone oxime-zinc chloride complex. |
| $-(CH_2)_5-$ | 2 | $ZrCl_4$ | Cyclohexanone oxime-zirconium tetrachloride complex. |

According to the process of this invention, the lactim-O-sulfonic acid metal compounds of formula (2) are reacted with the alicyclic ketoxime complexes of formula (3) in a substantially anhydrous condition. The reaction can also be carried out in the absence of a solvent. Usually, the reaction is preferably carried out in the presence of an inert organic solvent.

Any solvents which do not react with the reactants and the reaction products under the reaction conditions may be used. Examples of such solvents are halogenated hydrocarbons such as methylene chloride, ethylene chloride, ethylene bromide, trichloroethylene, tetrachloroethane, chloroform or carbon tetrachloride, aliphatic ethers such as 1,2-dimethoxygehane or diglyme, cyclic ethers such as dioxane or tetrahydrofuran, aromatic hydrocarbons such as benzene, toluene or xylene, aliphatic hydrocarbons such as hexane or heptane, and alicyclic hydrocarbons such as cyclohexane or cycloheptane.

The reaction is carried out under conditions to bring the compound of formula (2) in full contact with the compound of formula (3). Since the reaction proceeds even at room temperature, it is not necessary to heat the reaction mixture. However, it is proper to carry out the reaction at an elevated temperature, for example, from 0 to 150° C., preferably from room temperature to about 80° C.

The reaction time can be properly chosen according to the type of the reactants, the scale of the reaction, the type of the reaction, molar ratios, and the reaction temperatures.

The alicyclic ketoxime complexes are generally solid. When the complex is sparingly soluble in the above inert solvent, the complex is progressively dissolved as the reaction advances, and in many cases, the solid lactam complex separates as a precipitate. Where the resulting lactam complex is soluble in the inert solvent used for the reaction, the solvent is removed and recovered after completion of the reaction. Then, another solvent which may induce the precipitation of the lactam complex alone is added, and the precipitated lactam complex can be recovered by separating it according to a known method such as filtration.

The molar ratio between the lactin-O-sulfonic acid metal compound and the alicyclic ketoxime complex of formula (3) can be varied as desired, and there is no particular restriction on it.

When group $R_1$ of the compound of formula (2) is the same as group $R_2$ of the complex of formula (3), group $R_3$ of the complex of formula (1) is of course the same as these groups. When the group $R_1$ of the compound of formula (2) differs from the group $R_2$ of the complex of formula (3), there can be obtained a complex of formula (1) in which group $R_3$ is the same as group $R_1$ of the compound of formula (2), and depending upon the molar ratios, a complex in which group $R_3$ is the same as group $R_2$ of the complex of formula (3) is additionally obtained. Therefore, one can choose the molar ratio desirable for obtaining the intended complex compound of formula (1).

For instance, when the reaction is carried out under conditions in which the complex of formula (3) is present in the reaction system in an amount such that the molar concentration (A) of $$\left[ \underset{\smile}{R_2\overset{}{C}=NOH} \right]$$ 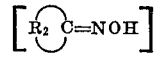

becomes higher than the molar concentration (B) of $$\left[ \underset{N}{\overset{C-OSO_2O-}{R_1\|}} \right]$$ 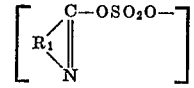

of the compound of formula (2), a complex of formula (1) which contains group $R_3$ the same as group $R_2$ of the complex of formula (3) can be obtained together with a complex of formula (1) having the group $R_3$ the same as group $R_1$ in a compound of the formula (2). Furthermore, when the reaction is performed under conditions in which the complex of formula (3) is present in the reaction system in an amount such that the molar concentration (A) does not exceed the molar concentration (B), there can be obtained a complex of formula (1) having group $R_3$ the same as group $R_1$ of the compound of formula (2), and it is difficult to form a complex of formula (1) which contains group $R_3$ the same as the group $R_2$ of the complex of formula (3), and the progress of the reaction becomes more smooth. If, at this time, the resulting complex of formula (1) containing group $R_3$ the same as group $R_1$ in formula (2) is separated from the reaction product and the complex of formula (3) is further added to the mother liquor and the reaction is repeatedly carried out, the molar concentration (A) becomes higher than the molar concentration (B). Hence, it is possible to form a complex of formula (1) having $R_3$ the same as group $R_2$ of the complex of formula (3) as a main product.

If the reaction is carried out under conditions in which the molar concentration (A) is excessively larger than the molar concentration (B), there is a tendency that the progress of the reaction becomes less smooth. Accordingly, it is preferred that the molar concentration (A) be not too much higher than the concentration (B). Generally, it is preferred that the complex of formula (3) be present in the reaction system in an amount such that the molar concentration (A) of the complex of formula (3) does not exceed about 5 molar times the molar concentration (B) of the compound of formula (2). More preferably, the concentration (A) should be not more than about 2 molar times the concentration (B). It is especially preferable to perform the reaction under condition in which the molar concentration (A) does not exceed the molar concentration (B).

It is assumed from the results of the reaction described above that the process of this invention is in accordance with the new rearrangement reaction mechanism shown below.

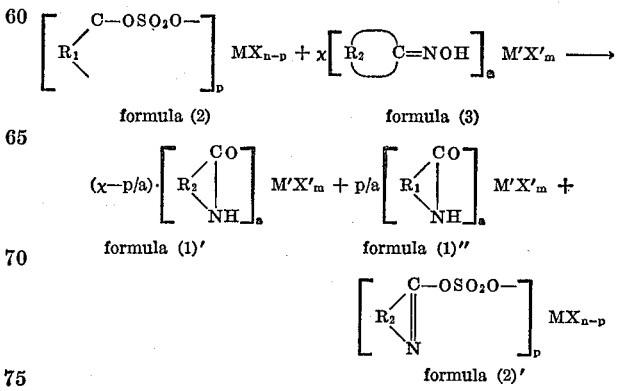

wherein $x$ is a positive integer larger than 0, and other symbols are the same as already described.

Formula (1) include both formulae (1)' and (1)''.

It has been experimentally confirmed that when $x$ in the above formula is equal to, or less than, $p/a$, the compound

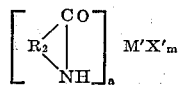

is difficult to form.

The compound of formula (2)' which remains after separation of the product of formula (1) [formulae (1)' and (1)''] from the reaction products can be recycled to the rearrangement reaction system.

Specific examples of the product of formula (1) obtained by the process of this invention are shown below.

| $R_3$ | $a$ | $M'X'_m$ | Compounds |
|---|---|---|---|
| $-(CH_2)_3-$ | 2 | $SnCl_4$ | Butyrolactam-stannic chloride complex. |
| $-(CH_2)_4-$ | 2 | $SnCl_4$ | Valerolactam-stannic chloride complex. |
| $-(CH_2)_5-$ | 2 | $SnCl_4$ | Caprolactam-stannic chloride complex. |
| $-(CH_2)_6-$ | 2 | $SnCl_4$ | Enantholactam-stannic chloride complex. |
| $-(CH_2)_7-$ | 2 | $SnCl_4$ | Caprilolactam-stannic chloride complex. |
| $-(CH_2)_8-$ | 2 | $SnCl_4$ | Pelargonolactam-stannic chloride complex. |
| $-(CH_2)_9-$ | 2 | $SnCl_4$ | Caprilactam-stannic chloride complex. |
| $-(CH_2)_{10}-$ | 2 | $SnCl_4$ | Undecanolactam-stannic chloride complex. |
| $-(CH_2)_{11}-$ | 2 | $SnCl_4$ | Laurolactam-stannic chloride complex. |
| $-(CH_2)_2CH(CH_2)_2-$<br>$\quad\|$<br>$\quad CH_3$ | 2 | $SnCl_4$ | $\gamma$-Methylcaprolactam-stannic chloride complex. |
| $-(CH_2)_3CH\cdot CH_2-$<br>$\quad\|$<br>$\quad CH_3$ | 2 | $SnCl_4$ | $\beta$- or $\delta$-Methylcaprolactam-stannic chloride complex. |
| $-(CH_2)_4CH-$<br>$\quad\|$<br>$\quad CH_3$ | 2 | $SnCl_4$ | $\alpha$- or $\epsilon$-Methylcaprolactam-stannic chloride complex. |
| $-(CH_2)_2CH\cdot CH_2-$<br>$\quad\|$<br>$\quad CH_3$ | 2 | $SnCl_4$ | $\beta$- or $\gamma$-Methylvalerolactam-stannic chloride complex. |
| $-CH(CH_2)_3-$<br>$\quad\|$<br>$\quad C_2H_5$ | 2 | $SnCl_4$ | $\delta$-Ethylvalerolactam-stannic chloride complex. |
| $-(CH_2)_2CH(CH_2)_2-$<br>$\quad\|$<br>$\quad CH=CH_2$ | 2 | $SnCl_4$ | $\gamma$-Vinylcaprolactam-stannic chloride complex. |
| $\quad CH_3$<br>$\quad\|$<br>$-C(CH_2)_4-$<br>$\quad\|$<br>$\quad CH_3$ | 2 | $SnCl_4$ | $\epsilon,\epsilon$-Dimethylcaprolactam-stannic chloride complex. |
| $-(CH_2)_4CH-$<br>$\quad\|$<br>$\quad NO_2$ | 2 | $SnCl_4$ | $\alpha$-Nitrocaprolactam-stannic chloride complex. |
| $\quad C_6H_5$<br>$\quad\|$<br>$-(CH_2)_4C-$<br>$\quad\|$<br>$\quad C_6H_5$ | 2 | $SnCl_4$ | $\alpha,\alpha$-Diphenylcaprolactam-stannic chloride complex. |
| $-(CH_2)_4CH-$<br>$\quad\|$<br>$\quad Cl$ | 2 | $SnCl_4$ | $\alpha$-Chlorocaprolactam-stannic chloride complex. |
| $-(CH_2)_5-$ | 2 | $SnBr_4$ | Caprolactam-stannic bromide complex. |
| $-(CH_2)_5-$ | 1 | $SbCl_5$ | Caprolactam-antimony pentachloride complex. |
| $-(CH_2)_5-$ | 1 | $BF_3$ | Caprolactam-boron trifluoride complex. |
| $-(CH_2)_5-$ | 2 | $ZnCl_2$ | Caprolactam-zinc chloride complex. |
| $-(CH_2)_5-$ | 2 | $ZnCl_4$ | Caprolactam-zirconium tetrachloride complex. |

The production of free lactams from the lactam complexes of formula (1) can be performed by reacting the lactam complexes with bases stronger than the lactams, such as ammonia, alkali hydroxides, pyridine, triethylamine, or oximes, or with ammonium chloride. The process of this invention is valuable as an industrial process for producing the lactams.

The lactim-O-sulfonic acid metal compound expressed by formula (2), that is used as a rearrangement reagent in the present invention can be obtained by any of the following methods (A) through (F).

(A) It is obtained by dehydrohalogenating a metal halide expressed by the formula (4)

$$MX_n \qquad (4)$$

wherein M, X and $n$ have the same meanings as defined in formula (2), and a lactim-O-sulfonic acid of formula (5)

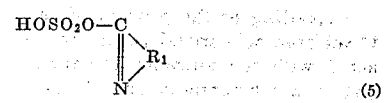

wherein $R_1$ is the same as defined in formula (2), in a substantially anhydrous condition.

Examples of the compounds expressed by formula (4) include zinc chloride, boron trichloride, aluminum chloride, aluminum bromide, stannic chloride, stannic bromide, stannic dichloro-dibromide, stannic dichloro-difluoride, zirconium tetrachloride, titanium tetrachloride, silicon tetrachloride, germanium tetrachloride, lead tetrachloride, thorium tetrachloride, hafnium tetrachloride, or antimony pentachloride.

Examples of the lactim-O-sulfonic acid expressed by the formula (5) are shown below.

| $R_1$ | Compounds |
|---|---|
| $-(CH_2)_3-$ | Butyrolactim-O-sulfonic acid. |
| $-(CH_2)_4-$ | Valerolactim-O-sulfonic acid. |
| $-(CH_2)_5-$ | Caprolactim-O-sulfonic acid. |
| $-(CH_2)_6-$ | Enantholactim-O-sulfonic acid. |
| $-(CH_2)_7-$ | Caprilolactim-O-sulfonic acid. |
| $-(CH_2)_8-$ | Pelargonolactim-O-sulfonic acid. |
| $-(CH_2)_9-$ | Caprilactim-O-sulfonic acid. |
| $-(CH_2)_{10}-$ | Undecanolactim-O-sulfonic acid. |
| $-(CH_2)_{11}-$ | Laurolactim-O-sulfonic acid. |
| $-(CH_2)_2\cdot CH(CH_2)_2-$<br>$\quad\|$<br>$\quad CH_3$ | $\gamma$-Methylcaprolactim-O-sulfonic acid. |
| $-(CH_2)_3CH\cdot CH_2-$<br>$\quad\|$<br>$\quad CH_3$ | $\beta$- or $\delta$-Methylcaprolactim-O-sulfonic acid. |
| $-(CH_2)_4CH-$<br>$\quad\|$<br>$\quad CH_3$ | $\alpha$- or $\epsilon$-Methylcaprolactim-O-sulfonic acid. |
| $-(CH_2)_2CH\cdot CH_2-$<br>$\quad\|$<br>$\quad CH_3$ | $\beta$- or $\gamma$-Methylvalerolactim-O-sulfonic acid. |
| $-CH(CH_2)_3-$<br>$\quad\|$<br>$\quad C_2H_5$ | $\delta$-Ethylvalerolactim-O-sulfonic acid. |
| $-(CH_2)_2CH(CH_2)_2-$<br>$\quad\|$<br>$\quad CH=CH_2$ | $\gamma$-Vinylcaprolactim-O-sulfonic acid. |
| $\quad CH_3$<br>$\quad\|$<br>$-C(CH_2)_4-$<br>$\quad\|$<br>$\quad CH_3$ | $\epsilon,\epsilon$-Dimethylcaprolactim-O-sulfonic acid. |
| $-(CH_2)_4CH-$<br>$\quad\|$<br>$\quad NO_2$ | $\alpha$-Nitrocaprolactim-O-sulfonic acid. |
| $\quad C_6H_5$<br>$\quad\|$<br>$-(CH_2)_4C-$<br>$\quad\|$<br>$\quad C_6H_5$ | $\alpha,\alpha$-Diphenylcaprolactim-O-sulfonic acid. |
| $-(CH_2)_4CH-$<br>$\quad\|$<br>$\quad Cl$ | $\alpha$-Chlorocaprolactim-O-sulfonic acid. |

The reaction can be performed even in the absence of a solvent, but it is preferably carried out in an inert organic solvent which is the same as those already described with respect to the reaction between the compound of formula (2) and the complex of formula (3). The reaction is carried out under conditions which bring the compound of formula (4) into full contact with the compound of formula (5). Since the reaction proceeds at room temperature, it is not necessary to heat the reaction system in particular. However, in order to accelerate the reaction rate, it is carried out frequently at an elevated temperature above room temperature, for example, from 20° to 160° C. Preferably, the reaction is carried out at room temperature to about 100° C. When an inert solvent is used, the reaction should be carried out at a temperature below the boiling point of the solvent. The reaction pressure is not particularly limited, and the reaction can be carried out at any desired pressure. In order to accelerate the reaction, the reaction is desirably carried out at a somewhat elevated temperature while introducing an inert gas such as nitrogen gas into the reaction system. By this procedure, the resulting hydrogen halide can be readily removed from the system, and the reaction proceeds smoothly.

The progress of the reaction can usually be known by the evolution of the hydrogen halide as a result of dehydrohalogenation reaction. The dehydrohalogenation reaction can be accelerated by adding a lactam complex of the formula (6)

(6)

wherein $a$ is 1 or 2, and all other symbols have the same meanings as described with respect to the formula (2), in an amount not more than an equal mol of the lactim-O-sulfonic acid of formula (5). Other promotors that can be equally utilized include compounds of formula (7) below $$[(R_4)_3PO]_a MX_n \quad (7)$$

wherein $R_4$ is an alkyl group having up to 5 carbon atoms, a cycloalkyl group having 3 to 7 carbon atoms, and aryl group having 6 to 8 carbon atoms or an aralkyl group up to 9 carbon atoms, $a$ is 1 or 2, and M, X and $n$ have the same meanings as described with respect to formula (2), which are complexes formed between phosphine oxides and metal halides.

When the metal halide of formula (4) is stannic chloride, complexes formed between organic bases having no active hydrogen and stannic chloride such as 1,5-diazabicyclo[5,4,0]undeca-5-ene stannic chloride complex can be used as a dehydrochlorination reagent. In this case, hexachloro stannates of the organic bases such as 1,5-diazabicyclo[5,4,0]undeca-5-ene hexachloro stannate are by-produced together with the compound of the formula (2).

(B) It is obtained by reacting a lactam metal salt of formula (8)

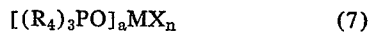

(8)

wherein all symbols are the same as those described in formula (2), with sulfur trioxide in an amount equal to the mols of the lactam groups of the lactam metal salt. Alternatively, the compound of formula (2) can be produced by reacting the compound of formula (8) with the compound of formula (5) shown in (A) above.

The former reaction can be expressed schematically as follows:

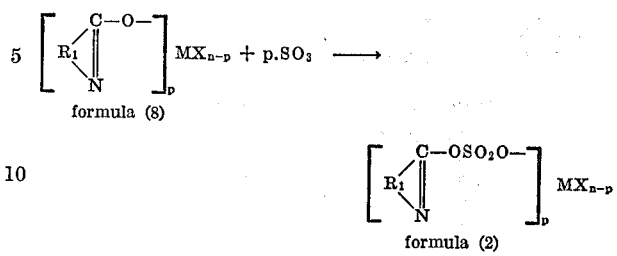

The latter reaction can be shown schematically as follows:

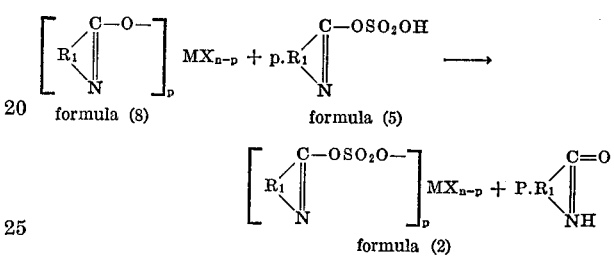

In the latter reaction, a lactam corresponding to the lactam metal salt expressed by formula (8) is formed, and therefore, it is more convenient to have a metal halide of formula (4) be present in the reaction system conjointly. By this, the resulting lactam is converted to a lactam complex expressed by formula (6), and the reaction proceeds smoothly.

(C) The compound of formula (2) can also be prepared by reacting an alicyclic ketoxime metal salt of formula (9) below

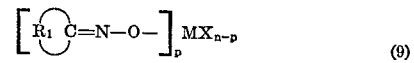

(9)

wherein all symbols have the same meanings as defined with respect to formula (2), with sulfur trioxide, and heating the resulting alicyclic ketoxime-O-sulfonic acid metal compound of formula (10)

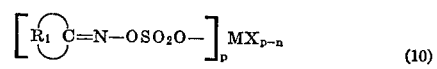

(10)

wherein all symbols are the same as defined with respect to formula (2), to effect the thermal rearrangement. This reaction can be expressed schematically as follows:

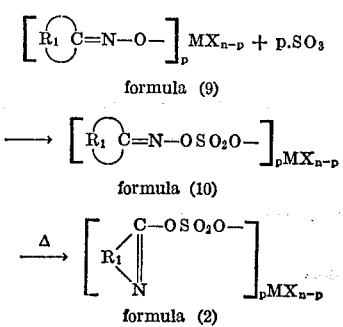

(D) The compound of formula (2) can also be prepared by reacting the alicyclic ketoxime metal salt expressed by the formula (9) with the lactim-O-sulfonic acid expressed by the formula (5). At this time, it is preferred to carry out the reaction in the presence of a metal halide of formula (4). The reaciton can be schematically shown below.

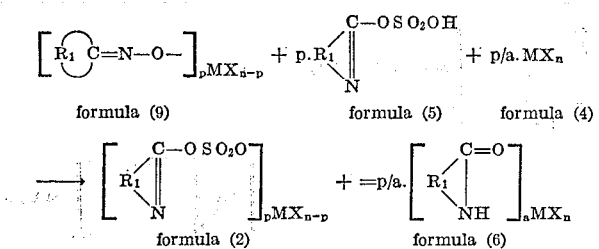

(E) The compound of formula (2) can also be prepared by reacting a salt of Ag, Hg or Tl with the lactim-O-sulfonic acid of formula (5), which is expressed by formula (11)

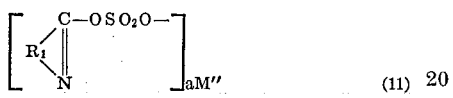

wherein M″ is Ag, Hg or Tl, $a$ is 1 or 2, when M″ is Hg, $a$ is 2, and $R_1$ is the same as defined with respect to formula (2), with a metal halide of formula (4) above. This reaction involves the elimination of a metal halide, and can be schematically shown as follows:

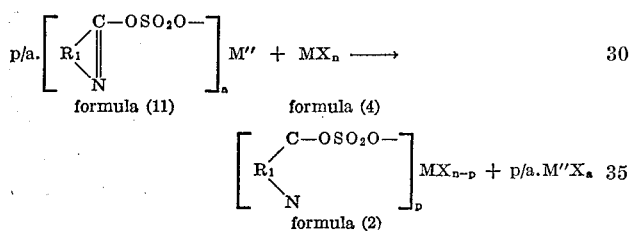

(F) The compound of formula (2) can also be prepared by reacting an alicyclic ketoxime-O-sulfonic acid metal salt of the formula (12) below

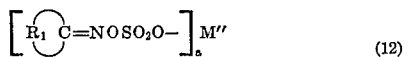

wherein $R_1$ is the same as defined with respect to formula (2), and $a$ and M″ are the same as defined with respect to formula (11), with a metal halide expressed by formula (4) above, and heating the resulting alicyclic ketoxime-O-sulfonic acid metal compound of formula (10) above to induce thermal rearrangement. This reaction involving the elimination of a metal halide can be schematically shown by the following reaction equation:

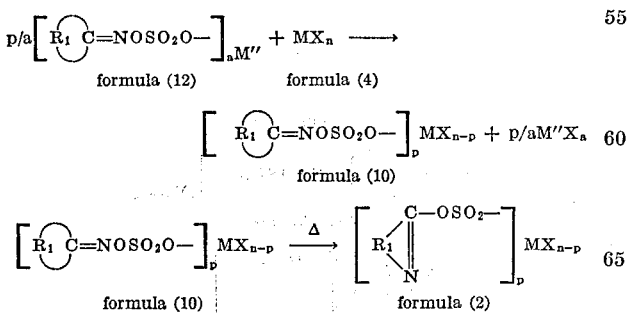

The invention will now be described specifically by the following Examples.

Example 1

To a mixture of ε-caprolactam (13.58 g., 120 mmoles) and ε-caprolactam-zirconium tetrachloride complex (27.56 g., 60 mmoles) in ethylene dichloride (520 ml.), a solution of sulfur trioxide (10 ml., 240 mmoles) in ethylene dichloride (80 ml.) was added dropwise with stirring at room temperature. An exothermic phenomenon was observed and the mixture became a clear solution. The solution of ε-caprolactim-O-sulfonic acid (240 mmoles) and zirconium tetrachloride (60 mmoles) in ethylene dichloride (600 ml.) thus prepared was heated under reflux with stirring. Hydrogen chloride generated by the reaction was introduced by using a dry nitrogen carrier gas into a trap containing an aqueous solution of sodium hydroxide, so that the quantity of the hydrogen chloride could be determined. By refluxing for 4 hrs., 226.4 mmoles of hydrogen chloride evolved. The quantity corresponded to 94.4% of the theoretical value (240 mmoles) based upon the ε-caprolactim-O-sulfonic acid. Colorless crystals separated gradually from the solution with the progress of the dehydrochlorination reaction. After refluxing for 4 hrs., the reaction mixture was allowed to cool at room temperature, and then filtered to give 47.74 g. of colorless crystals. It was confirmed that the product was zirconium tetrakis(ε-caprolactam-O-sulfonate) by elemental analysis and IR-spectrum, which exhibits characteristic absorption bands at 2940 (m), 2865 (w), 1560 (s), 1475 (m), 1450 (m), 1420 (w), 1350 (m), 1340 (m), 1210 (s), 1195 (m), 1020 (m), 670 (sm), 590 (w) and 570 cm.$^{-1}$ (m). The yield was 92.5% m.p. 213° C.

*Analysis.*—Calcd. for $C_{24}H_{40}N_4O_{16}S_4Zr$: C, 33.51; H, 4.69; N, 6.52; S, 14.91. Found: C, 32.94; H, 4.64; N, 6.66; S, 14.34%.

Example 2

A suspension of zirconium tetrakis(ε-caprolactim-O-sulfonate) (10.32 g., 12 mmoles) in ethylene dichloride (100 ml.) was heated on an oil bath at 60° C. Cyclohexanone oxime-stannic chloride complex (5.84 g., 12 mmoles) was added to the suspension with stirring at 60° C. An exothermic phenomenon was observed. The temperature of the mixture rose at the highest to 67.5° C. 1.5 minutes after the addition. Thereafter the temperature fell gradually. Ten minutes after the first addition, cyclohexanone oxime-stannic chloride complex (5.84 g., 12 mmoles) was again added to the mixture at 62.5° C. The temperature rose at the highest to 69° C. 2 minutes thereafter. The reaction mixture was maintained at 62° C. or above for 10 minutes from the second addition of the oxime complex, and then allowed to cool at room temperature with stirring. The mixture was filtered to afford 15.12 g. of colorless crystals, which was a mixture comprising ε-caprolactam-stannic chloride complex (10.51 g.) and zirconium tetrakis(ε-caprolactim-O-sulfonate) (4.61 g.). The yield of the lactam complex was 90.0% based upon the oxime complex added.

Example 3

A suspension of zirconium tetrakis(ε-caprolactim-O-sulfonate) (8.60 g., 10 mmoles) in ethylene dichloride (150 ml.) was heated to 60° C. in an oil bath, and the bath temperature was maintained at 60° C. Cyclohexanone oxime-stannic chloride complex (7.30 g., 15 mmoles) was again added to the mixture. Such addition was further repeated six times at intervals of 10 minutes. An exothermic reaction occurred at each addition of the oxime complex, and the highest temperatures attained thereby were: 66.0° C. after the first addition and thereafter, respectively, 67.0° C., 68.0° C., 67.5° C., 68.0° C., 69.0° C., 67.5° C. and 69.0° C.

After the eighth addition, the reaction mixture was maintained at 65° C. or above for 10 minutes, and the stirring was continued until the mixture cooled to room temperature. The mixture was filtered to give 52.01 g. of colorless crystals, which was a mixture consisting of ε-caprolactam-stannic chloride complex (49.16 g.) and zirconium tetrakis(ε-caprolactim - O - sulfonate) (2.85 g.). Thus, the yield of the lactam complex obtained by filtration was 84.2% of the theoretical value (58.40 g.) based upon the oxime complex added.

Example 4

A suspension of zirconium tetrakis(ε-caprolactim-O-sulfonate) (7.74 g., 9 mmoles) in ethylene dichloride (150 ml.) was heated to 60° C. Cyclohexanone oxime-zirconium tetrachloride complex (49.60 g., 108 mmoles) was added with stirring to the solution, in 8 portions, at intervals of 10 minutes. Exothermic phenomena were observed at each addition of the oxime complex. After the last addition, the reaction mixture was maintained at 65° C. or above for 10 minutes and then allowed to cool to room temperature. The stirring was continued for 4 hours, and then the mixture was filtrated to give 40.8 g. of ε-caprolactam zirconium tetrachloride complex as colorless crystals. The yield was 82.3%.

Example 5

To a suspension of ε-caprolactam-stannic chloride complex (23.4 g., 48 mmoles) in ethylene dichloride (200 ml.) a solution of sulfur trioxide (2.0 ml., 48 mmoles) in ethylene dichloride (40 ml.) was added dropwise, with stirring, at room temperature. An exothermic phenomenon was observed and the mixture became a clear solution, which comprised ε - caprolactim - O - sulfonic acid (48 mmoles), stannic chloride (24 mmoles), and ε-caplolactam-stannic chloride complex (24 mmoles) as a promotor for the dehydrochlorination reaction. The solution was heated under reflux and hydrogen chloride generated from the reaction was trapped in a similar manner to Example 1.

By refluxing for 14 hrs., 48 mmoles of hydrogen chloride evolved. This amount corresponds to 100% of theoretical value (48 mmoles) based upon the ε-caprolactim-O-sulfonic acid. Dichlorotin(IV) bis(ε-caprolactim - O - sulfonate) was confirmed to be synthesized *in situ*, by the result of the dehydrochlorination reaction and NMR-spectrum having showed no proton signal in a region of sulfonic acid, as well as by the following treatment of the solution with zirconium tetrachloride, which gave zirconium tetrakis(ε-caprolactim-O-sulfonate). Thus, the solution comprising dichlorotin - (IV) bis(ε - caprolactim-O-sulfonate) and ε-caprolactam-stannic chloride complex was prepared.

Zirconium tetrachloride (14.0 g., 60 mmoles) was added to the solution, with stirring, at room temperature. The zirconium tetrachloride immediately dissolved exothermically, whereby the temperature of the mixture rose by 4° C. The stirring was continued, and a precipitate formed gradually. The reaction mixture was filtered to give 8.9 g. of colorless crystals which was identified as zirconium tetrakis(ε-caprolactim-O-sulfonate) by IR-spectrum. The yield was 86.2%.

Example 6

To a solution of dichlorotin(IV) bis(ε-caprolactim-O-sulfonate) (24 mmoles) in ethylene dichloride (100 ml.) containing ε-caprolactam-stannic chloride complex (24 mmoles), prepared by the method described in Example 5, cyclohexanone oxime-stannic chloride complex (11.7 g., 24 mmoles) was added with stirring at room temperature (23° C.). The temperature of the mixture thereupon rose gradually and the mixture became a homogeneous solution after about 10 minutes. Thirty five minutes after the addition of the oxime complex, the temperature reached the high point of 38° C. and thereafter it fell gradually. The temperature fell to 33° C. fifty minutes after the addition, when the mixture was externally cooled to room temperature (24° C.). Then, the oxime complex (11.7 g., 24 mmoles) was again added and the stirring was continued. An exothermic phenomenon was observed and the temperature of the mixture rose at the highest to 39° C. 30 minutes after the second addition. The mixture was stirred for 3 hours after the second addition, and then it was filtered to give 23.20 g. of colorless crystals, which were identified as the crystals of a pure ε-caprolactam-stannic chloride complex. The yield was 99% based upon the oxime complex added.

Example 7

To a solution of dichlorotin(IV) bis(ε-caprolactim-O-sulfonate) (24 mmoles) in ethylene dichloride (100 ml.) containing ε - caprolactam - stannic chloride complex (24 mmoles), prepared by the method described in Example 5, cyclohexanone oxime-stannic chloride complex (8.78 g., 18.0 mmoles) was added with stirring at 60° C. The oxime complex was dissolved immediately and the temperature of the mixture rose, at the highest, to 76° C. one minute after the addition. Thereafter the temperature fell gradually. Then the oxime complex (8.78 g., 18.0 mmoles) was added again to the reaction mixture seven minutes after the first addition. Such addition of the oxime complex (8.78 g., 18.0 mmoles) was further repeated twice at intervals of seven minutes. The highest temperatures attained due to the exothermic reaction caused by the additions were 72.0° C. after the second addition, 73.0° C. after the third addition and 72.0° C. after the forth addition. After the last addition of the oxime complex, the mixture was stirred at room temperature for 3 hours, then cooled and stirred at 10° C. or below for 30 minutes. Collecting the crystals by filtration, 35.2 g. of ε-caprolactam-stannic chloride complex was obtained. The yield was quantitative based upon the oxime complex added.

Example 8

A solution of dichlorotin (IV) bis(ε-caprolactim-O-sulfonate) (24 mmoles) and ε-caprolactam-stannic chloride complex (24 mmoles) in ethylene dichloride (200 ml.), prepared in the same manner as Example 5, was heated to 60° C. Cyclohexanone oxime-stannic chloride complex (70.4 g., 144.6 mmoles) was added to the solution with stirring, in eight portions, at intervals of 10 minutes. The temperature of the reaction mixture rose to 65° C., three minutes after the first addition of the oxime complex. Ten minutes after the addition, the second portion of the oxime complex was added to the mixture at 60° C. Such addition was repeated further 6 times. The exothermic reactions occurred at each addition of the oxime complex, and the highest temperatures attained thereby were: 64.0° C. after the second addition and thereafter, respectively, 63.0° C., 63.8° C., 63.5° C., 62.5° C., 64.0° C. and 62.0° C. After the eighth addition, the temperature of the reaction mixture was maintained at 60° C. or above for 10 minutes, if required, by external heating. The mixture was then allowed to cool at room temperature with stirring, and then filtered to give 70.6 g. of colorless crystals which were identified as the crystals of a pure ε-caprolactam-stannic chloride complex. The yield was quantitative, based upon the oxime complex added.

Example 9

A solution of dichlorotin (IV) bis(ε-caprolactim-O-sulfonate) (24 mmoles) and ε-caprolactam-stannic chloride complex (24 mmoles) in ethylene dichloride (240 ml.), prepared in the same manner as Example 5, was heated to 65° C. Cyclohexanone oxime-stannic chloride complex (117 g., 240.3 mmoles) was added to the solution, in 15 portions, at intervals of 10 minutes, in an analogous manner to Example 8. Exothermic phenomena were observed at each addition of the oxime complex. After the 15th addition of the oxime complex, the reaction mixture was maintained for an additional 10 minutes at 65° C. or above. Then, the mixture was allowed to cool, with stirring at room temperature, and filtered to give 117.6 g. of ε-caprolactam-stannic chloride complex.

Example 10

A solution of dichlorotin (IV) bis(ε-caprolactim-O-sulfonate) and ε-caprolactim-stannic chloride complex in ethylene dichloride was prepared from ε-caprolactim-O-sulfonic acid (0.82 mole) and stannic chloride (0.41 mole) in ethylene dichloride (3200 ml.) in the presence of ε-caprolactam-stannic chloride complex (0.41 mole) as a promotor for the dehydrochlorination reaction, in a similar manner to Example 5. The solution was fed into a reactor through an inlet tube and allowed to react at 70–80° C. with the cyclohexanone oxime-stannic chloride complex, which was fed into the reactor separately through another inlet tube. The reaction mixture was then introduced into a crystallizer, in which the mixture was cooled to crystallize the product, ε-caprolactam-stannic chloride complex. The lactam complex was separated by filtration, and the filtrate was recycled to the said reactor, and allowed to react with the oxime complex which was newly fed. The crystallization, filtration, recyclization of the filtrate, and reaction with the oxime complex were repeated. The amount of the oxime complex fed was 49.8 g./hr., and the amount of the filtrate recycled was 1320 ml./hr. The continuous reaction was carried out for 60 horus and 40 minutes. The total amount of the oxime complex fed was 3003 g. and the yield of the lactam complex obtained by filtration was 3017 g.

Example 11

A mixture of ε-caprolactim-O-sulfonic acid (48 mmoles) and stannic chloride (24 mmoles) was heated at 80° C. under reduced pressure at 10 mm. Hg, without solvent. The amount of hydrogen chloride generated from the mixture by heating for 8 hours, was 27.6 mmoles. The resultant yellow paste was dissolved in ethylene dichloride (240 ml.) and ε-caprolactam-stannic chloride complex (11.7 g., 24 mmoles) as a promotor for the dehydrochlorination reaction was added to the solution. The solution was heated under reflux and the dehydrochlorination reaction was further continued. After the overall amount of hydrogen choride generated had reached 48 mmoles, the resultant solution was allowed to react at 70° C. with cyclohexanone oxime-stannic cholride complex (117.0 g., 240.3 mmoles) which was added in 15 portions, at intervals of 10 minutes, in an analogous manner to Example 8. Collecting the crystals by filtration, 116.1 g. of ε-caprolactam-stannic chloride complex was obtained.

Example 12

A dehydrochlorination reaction of ε-caprolactim-O-sulfonic acid (48 mmoles) with stannic chloride (24 mmoles) was carried out similarly to Example 5, except that triethylphosphine oxide-stannic chloride complex (12.69 g., 24 mmoles) was used as a promotor for the reaction in place of ε-caprolactam-stannic chloride complex. By refluxing for 18 hrs., 46.4 mmoles of hydrogen chloride was generated, which corresponds to 96.7% of theoretical value (48 mmoles) based upon ε-caprolactim-O-sulfonic acid used.

To the resultant solution comprising dichlorotin (IV) bis(ε-caprolactim-O-sulfonate) and the phosphine oxide complex, cyclohexanone oxime-stannic chloride complex (117.0 g., 240.3 mmoles) was added with stirring at 60° C. in fifteen portions, at intervals of 10 minutes, and the reaction was carried out in an analogous manner to Example 8. Collecting the crystals by filtration, 93.9 g. of ε-caprolactam-stannic chloride complex was obtained.

Example 13

A dehydrochlorination reaction of ε-caprolactim-O-sulfonic acid (48 mmoles) with stannic chloride (24 mmoles) was performed similarly to Example 5, except that triphenylphosphine oxide-stannic chloride complex (19.61 g., 24 mmoles) was used as a promotor for the reaction, in place of ε-caprolactam-stannic chloride complex. By refluxing for 15.5 hrs., 47.2 mmoles of hydrogen chloride was generated, which corresponds to 98.3% of theoretical value (48 mmoles) based upon ε-caprolactim-O-sulfonic acid used.

To the resultant solution comprising dichlorotin (IV) bis(ε-caprolactim-O-sulfonate) and the phosphine oxide complex, cyclohexanone oxime-stannic chloride complex (70.4 g., 144.6 mmoles) was added with stirring at 60° C. in 8 portions, at intervals of 10 minutes, and the reaction was carried out in an analogous manner to Example 8. Collecting the crystals by filtration, 60.0 g. of ε-caprolactam-stannic chloride complex was obtained.

Example 14

To a suspension of ε-caprolactam-stannic chloride complex (11.7 g., 24 mmoles) in ethylene dichloride (160 ml.), a solution of sulfur trioxide (2.0 ml., 48 mmoles) in ethylene dichloride (40 ml.) was added dropwise. To the resultant solution of ε-caprolactim-O-sulfonic acid (48 mmoles) and stannic chloride (24 mmoles) in ethylene dichloride (200 ml.), 1,5-diazabicyclo [5, 4, 0] undec-5-ene-stannic chloride complex in a mole ratio of 2:1 (M.P. 142° C., Anal.—Calcd. for $C_{18}H_{32}N_4 \cdot SnCl_4$: C, 38.27; H, 5.71; N, 9.92%. Found: C, 37.76; H, 6.09; N, 9.90%.) (13.54 g., 24 mmole) was added as a dehydrochlorination reagent. The mixture was heated under reflux for 2 hours. Thus, a solution of dichlorotin(IV) bis(ε-caprolactim-O-sulfonate) and 1,5-diazabicyclo [5, 4, 0] under-5-ene hexachlorostannate in ethylene dichloride (200 me.) was prepared.

To the solution, which was preheated at 60° C., cyclohexanone oxime-stannic chloride complex (70.4 g., 144.6 mmoles) was added in 8 portions, at intervals of 10 minutes, and the rearrangement reaction was performed similarly to Example 8. Collecting the crystals by filtration, 58.6 g. of ε-caprolactam-stannic chloride complex was obtained.

Example 15

To a solution of di-ε-caprolactim dichlorotin(IV) (9.94 g., 24 mmoles) in ethylene dichloride (60 ml.), a solution of sulfur trioxide (2 ml., 48 mmoles) in ethylene dichloride (40 ml.) was added dropwise at room temperature. An exothermic reaction was observed and the temperature of the reaction mixture rose to 38° C. To the resultant solution of dichlorotin(IV) bis(ε-caprolactim-O-sulfonate) (24 mmoles) in ethylene dichloride (100 ml.), cyclohexanone oxime-stannic chloride complex (70.4 g., 144.6 mmoles) was added with stirring, at 60° C., in eight portions, at intervals of 10 minutes, and the rearrangement reaction was carried out in an analogous manner to Example 8. Collecting the crystals by filtration, 59.1 g. of ε-caprolactam-stannic chloride complex was obtained.

Example 16

A solution of di-ε-caprolactim dichlorotin(IV) (9.94 g., 24 mmoles) in ethylene dichloride (40 ml.) was added dropwise, with stirring, at room temperature, to a solution of ε-caprolactim-O-sulfonic acid (48 mmoles) and stannic chloride (24 mmoles) in ethylene dichloride (80 ml.), which was prepared by the reaction of ε-caprolactam-stannic chloride complex (11.7 g., 24 mmoles) with sulfur trioxide (2 ml., 48 mmoles) in ethylene dichloride solution. To the resultant solution comprising dichlorotin-(IV) bis(ε-caprolactim-O-sulfonate) (24 mmoles) and ε-caprolactam-stannic chloride complex (24 mmoles) in ethylene dichloride (120 ml.), cyclohexanone oxime-stannic chloride complex (117.0 g., 240.3 mmoles) was added, in 15 portions, at intervals of 10 minutes, and the rearrangement reaction was performed in an analogous manner to the Example 8. Collecting the crystals by filtration, 112.6 g. of ε-caprolactam-stannic chloride complex was obtained.

Example 17

To a solution of dichlorotin(IV) bis(εcaprolactim-O-sulfonate) (24 mmoles) in ethylene dichloride (100 ml.), which was prepared by the method described in Example 15, cyclohexanone oxime-stannic bromide complex (31.9 g., 48 mmoles) was added, in two portions, at intervals of an hour, with stirring, at 25° C. The treatment was performed in a similar manner to Example 6. After being allowed to stand overnight, the reaction mixture was concentrated by rotary evaporation to give an oily residue, which was chromatographed on a silica gel column. Elution with ethylene dichloride followed by concentration of the elute afforded 27.32 g. of ε-caprolactam-stannic bromide complex.

Example 18

A solution of dichlorotin(IV) bis(ε-caprolactim-O-sulfonate) (12 mmoles) and ε-caprolactam-stannic chloride complex (12 mmoles) in ethylene dichloride (100 ml.) was prepared by the method described in Example 5. Cyclohexanone oxime-zirconium tetrachloride complex (4.13 g., 9 mmoles) was added at 60° C. with stirring to the solution. The oxime complex was dissolved immediately and the temperature of the mixture rose at the highest to 71.1° C. Thereafter the temperature fell gradually to 61.9° C. 10 minutes after the first addition, when the second addition of the oxime complex (4.13 g., 9 mmoles) was done. The temperature of the mixture rose again to 69.1° C. The addition of the oxime complex was further repeated 3 times at intervals of 10–15 minutes. After the 5th addition of the oxime complex, the mixture was treated in an analogous manner to example 8. The yield of ε-caprolactam-zirconium tetrachloride complex obtained by filtration was 16.17 g. (78.3%).

Example 19

A solution of dichlorotin(IV) bis(ε-caprolactim-O-sulfonate) (12 mmoles) and ε-caprolactam-stannic chloride complex (12 mmoles) in ethylene dichloride (70 ml.) and tetrachloroethane (30 ml.) was prepared in a similar manner to Example 5. To the solution, cyclododecanone oxime-stannic chloride complex (44.80 g., 68.4 mmoles) was added in 8 portions, at intervals of 11 minutes, at 60° C., with stirring. Exothermic phenomena were observed in each addition. After the eighth addition, the temperature of the mixture was maintained, at the lowest, 55° C. for 2 hours by an external heating. The reaction mixture was concentrated by rotary evaporation and the residue was treated with aqueous methanol to give 26.1 g. of laurolactam. This result indicates that the laurolactam-stannic chloride complex formed in the reaction was at least 35.5 g. The yield was 96.2% of the theoretical amount (36.9 g.).

What we claim is:

1. A process for producing lactam complexes expressed by the formula (1)

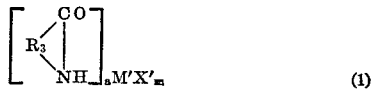  (1)

wherein $R_3$ is a group selected from $R_1$ and $R_2$ to be defined below, and M', X' m and a are the same as those defined below with respect to formula (3), which comprises reacting a lactim-O-sulfonic acid metal compound expressed by the formula (2) below

  (2)

wherein $R_1$ is an alkylene group or substituted alkylene group having 3 to 11 carbon atoms in the main chain, the substituents in the alkylene group being selected from: alkyl moieties having 1 to 6 carbon atoms; alkenyl moieties having 2 to 4 carbon atoms; nitro moieties; halide moieties; and phenyl moieties which may themselves be substituted by said foregoing moieties, M is a metal atom selected from metals of groups IIb, IIIa, IV and Va of the periodic table, X is a halogen atom, n is the maximum valency of M and is a positive integer of 2 to 5, and p is equal to n or a positive integer smaller than n, with an alicyclic ketoxime complex expressed by formula (3)

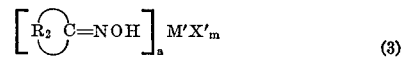  (3)

wherein $R_2$ has the same meaning as $R_1$ defined with respect to formula (2) and may be the same as, or different from, $R_1$, M' has the same meaning as M defined with respect to formula (2) and may be the same as, or different from, M, X' has the same meaning as X defined with respect to formula (2) and may be the same as, or different from, X, a is 1 or 2, and m is the maximum valency of M' and is a positive integer of 2 to 5, in a substantially anhydrous condition, in the presence of an inert organic solvent at a temperature of 0° to 150° C., wherein the amount of the compound of formula (3) is such that the mol concentration (A) of

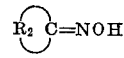

in the compound of formula (3) is not more than 5 times the mol concentration (B) of

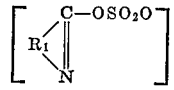

of the compound of formula (2).

2. The process of claim 1, wherein the mol concentration (A) is not more than 2 times the mol concentration (B).

3. The process of claim 1 wherein the amount of the compound of formula (3) is such that the mol concentration (A) does not exceed mol concentration (B).

4. The process of claim 1, wherein M and M' are metal atoms independently selected from the group consisting of metals of groups: IIb, 4th period; IIIa, 2nd to 6th periods; IV, 3rd to 7th periods; and Va, 5th and 6th periods; of the periodic table.

5. The process of claim 1, wherein M and M' are metal atoms independently selected from the group consisting of metals of groups: IIb, 4th period, IIIa, 2nd and 3rd periods; IV, 4th to 7th periods and Va, 5th period; of the periodic table.

6. The process of claim 1, wherein the temperature is from room temperature to about 80° C.

References Cited

UNITED STATES PATENTS 3,687,938  8/1972  Masaki et al. ____ 260—239.3 R
3,700,656  10/1972  Masaki et al. ____ 260—239.3 R HENRY R. JILES, Primary Examiner R. T. BOND, Assistant Examiner U.S. Cl. X.R.

260—239.3 R, 270, 313.1, 293.86, 326.5 FN, 239 B, 366 A, 294.8 F, 429.5, 429.7, 429.9, 448.2, 429.3, 429, 435, 429.1, 446

UNITED STATES PATENT OFFICE
CERTIFICATE OF CORRECTION

Patent No. 3,828,028　　　　　　　　Dated August 6, 1974

Inventor(s)　　　Mitsuo MASAKI ET AL

It is certified that error appears in the above-identified patent and that said Letters Patent are hereby corrected as shown below:

In the Heading, insert patentees' foreign application priority information as follows:

-- Claims priority, application Japan, April 30, 1971, No. 46/28055. --

Column 18, line 19 thereof: cancel "sondition" and substitute -- condition -- therefor.

Signed and sealed this 28th day of January 1975.

(SEAL)
Attest:

McCOY M. GIBSON JR.　　　　　　　C. MARSHALL DANN
Attesting Officer　　　　　　　　Commissioner of Patents